UNITED STATES PATENT OFFICE.

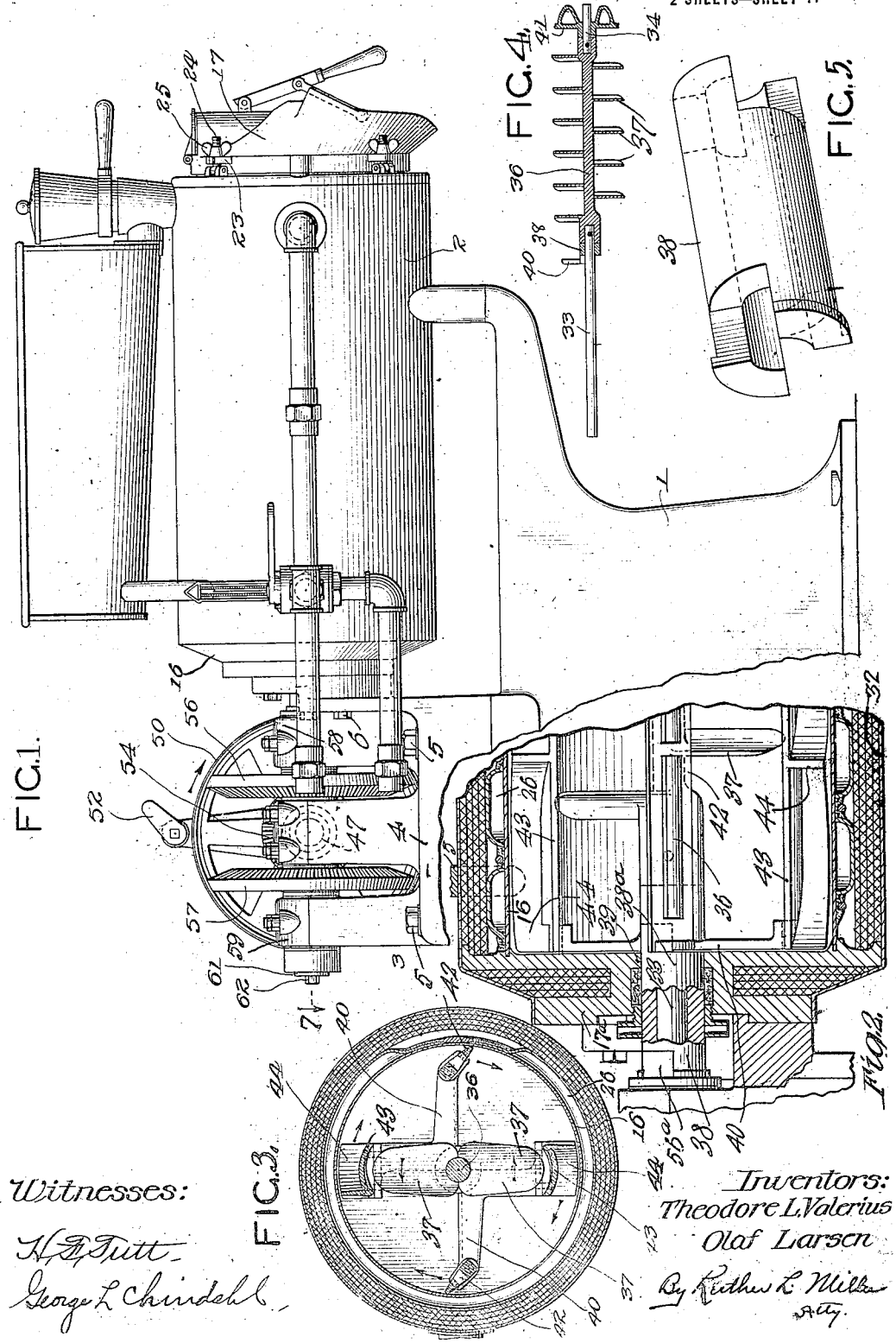

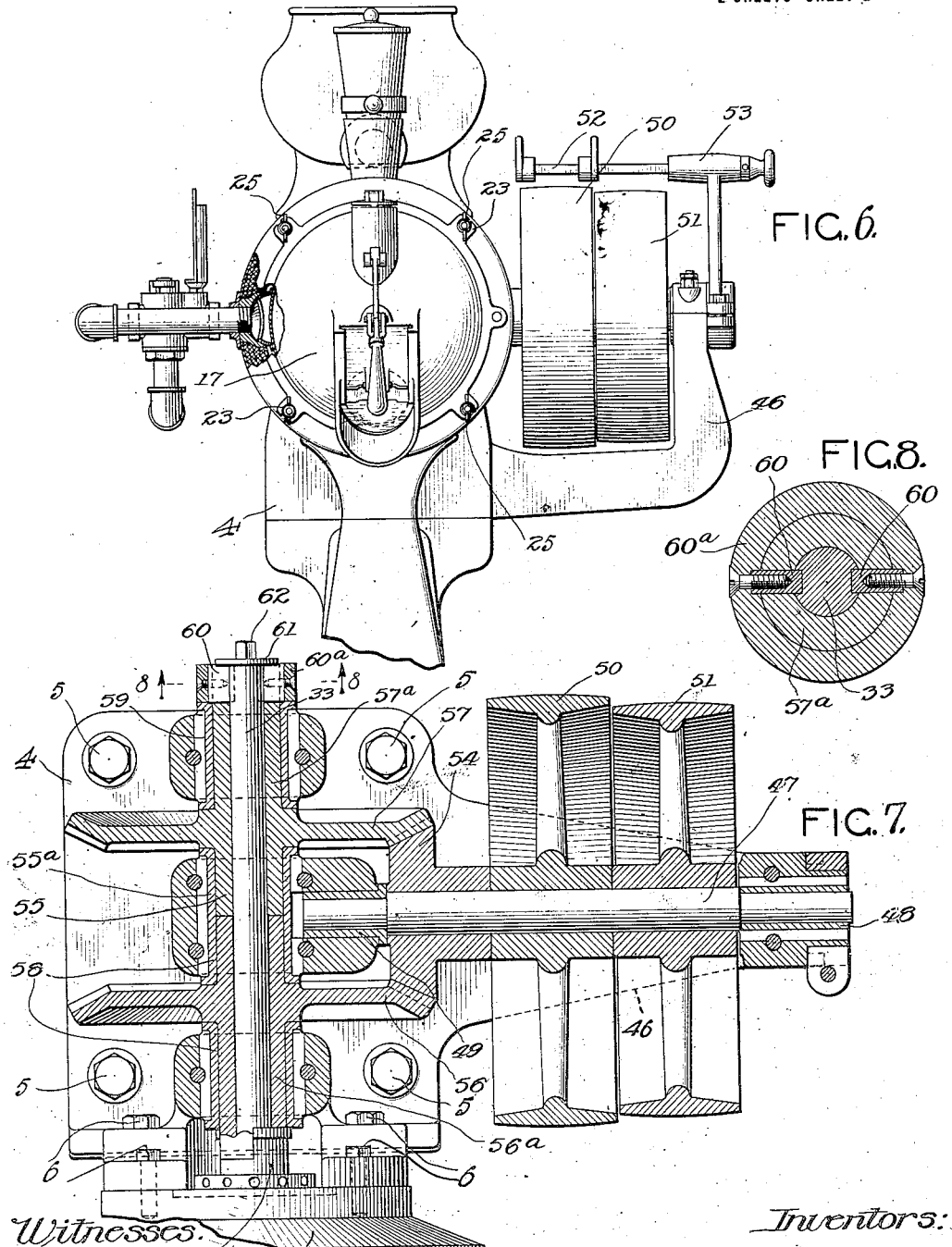

THEODORE L. VALERIUS AND OLAF LARSEN, OF FORT ATKINSON, WISCONSIN, ASSIGNORS TO CREAMERY PACKAGE MANUFACTURING COMPANY, A CORPORATION OF ILLINOIS.

ICE-CREAM FREEZER.

1,230,346.   Specification of Letters Patent.   Patented June 19, 1917.

Application filed January 13, 1913. Serial No. 741,626.

*To all whom it may concern:*

Be it known that we, THEODORE L. VALERIUS and OLAF LARSEN, citizens of the United States, residing at Fort Atkinson, in the county of Jefferson and State of Wisconsin, have invented certain new and useful Improvements in Ice-Cream Freezers, of which the following is a specification.

Our invention relates to ice-cream freezers and one of its objects is to provide a freezer in which every part shall be easily and conveniently accessible for cleaning purposes. In certain machines of the prior art, the agitator or dasher cannot be removed until a key has been removed from the gearing. This objection is obviated by our invention.

Another object of our invention is to provide means whereby all the mechanical portions of the freezer may be readily removed in case repairs are necessary. Not only is the agitator readily removable, but the driving gears and pulleys are arranged so as to form a unitary structure which may be removed from the machine base, taken to the repair shop, and replaced on the machine-base after repairs have been made. This structure, including the support for the gear and pulley shaft, as well as the gears and pulleys mounted thereon, is hereinafter for convenience termed the gear jack.

In the accompanying drawings, Figure 1 is a side elevation of an ice cream freezer embodying the principles of our invention. Fig. 2 is a fragmental vertical sectional view along the axis of the freezing cylinder. Fig. 3 is a transverse vertical section through the freezing cylinder and the agitating means. Fig. 4 is a longitudinal sectional view of a portion of the agitating means. Fig. 5 is a perspective view of a clutch collar. Fig. 6 is a fragmental front elevation of the freezer. Fig. 7 is a horizontal sectional view taken in the plane of line 7 of Fig. 1. Fig. 8 is a section on line 8—8 of Fig. 7.

In the embodiment of our invention herein illustrated, there is provided a base 1 which supports a freezing cylinder 2 and a gear jack 3. The base or frame of the gear jack is indicated by 4. The freezing cylinder 2 is provided with a fixed rear head 16 and a removable front head 17, the latter being detachably secured to the cylinder body by suitable means such as bifurcated lugs 23 on the head, bolts 24 pivoted on the cylinder body and wing nuts 25 on the bolts. (See Figs. 1 and 6).

Within the freezing cylinder, there is provided agitating means which comprises two sections, an inner and an outer, arranged to be revolved in opposite directions. The inner agitator section comprises a shaft 36 to which are fixed oppositely extending alternately spaced beater paddles 37 set at an angle so that they will have a tendency, when the shaft is rotated in the proper direction, to drive the material in the cylinder toward the rear head 16. This shaft 36 is supported at its forward end by a stub shaft 34 (Fig. 4) which is rotatably mounted in a suitable bearing in the front head 17, and the shaft 36 is supported at its rear end by a shaft 33 which extends through the rear head 16 and is journaled in a clutch collar 38, said clutch collar being in turn rotatably mounted in a bearing in the head 16. The outer end of the shaft 33 is rotatably mounted in the gear jack 3 to be presently described.

The other agitator section preferably comprises two spiders 40 and 41 located at opposite ends of the cylinder and each comprising four arms radiating from a central hub, said hubs being rotatably mounted upon the shafts 34 and 33 respectively. The hub of the spider 40 at the rear end of the cylinder is shaped to have a detachable engagement with the clutch collar 38. To the opposite arms of the two spiders are attached scraper bars 42 and sweep bars 43 which extend longitudinally of the cylinder and are positioned in alternate relation as indicated in Fig. 3. In the preferred form, each sweep bar is provided with a series of diagonal ribs 44 adapted, when the spiders are rotated in the proper direction, to move the contents of the cylinder toward the front head 17. The scraper bars 42 are pivoted in the spider arms and are arranged to contact with the inner periphery of the cylinder to scrape the frozen material therefrom. It will be understood that the cylinder is equipped exteriorly with suitable refrigerating means which may comprise a spiral conduit and connections for passing suitable freezing fluid therethrough.

We will next describe the means for rotating the inner and outer agitator sections in opposite directions. The gear jack 3 is removably mounted on the base 1 and is secured to said base by means of cap screws 5 and to the cylinder head 16 by cap screws 6. The gear jack comprises a bracket arm 46 to support the outer end of a drive shaft 47 which turns in bearings 48 and 49. A drive pulley 50 is keyed to the shaft 47 and an idler 51 is revolubly mounted on said shaft. A belt shifter 52 is supported by a bracket 53 attached to the bracket arm 46.

Connected to the shaft 47 is a bevel pinion 54 which meshes with bevel spur gears 56 and 57. Said spur gears have hubs or sleeves 55 which are supported in a bearing 55ª. The gear 56 has a sleeve or hub 56ª which is mounted in a bearing 58, and the gear 57 has a sleeve or hub 57ª which is supported in a bearing 59. The bearings 55ª, 58 and 59 are alined. The gear wheels 56 and 57 are rotated in opposite directions by the pinion 54. The hub 56ª of the gear wheel 56 is shaped to have a detachable engagement with the clutch collar 38, while the hub 57ª of the gear wheel 57 has a driving connection with the shaft 33 by means of keys 60 carried by a collar 60ª. The collar 60ª is mounted on the end of the hub 57ª and is held in place by a washer 61 and a screw 62.

Convenient access is afforded to every part of the freezer for cleansing purposes. The front head 17 may be removed by loosening the wing nuts 25 on the bolts 24, and after the screw 62 and washer 61 have been removed, the entire agitating means may be drawn out as a unit through the open end of the cylinder.

If it becomes necessary to make repairs in any portion of the gearing, the gear jack 3 may be removed bodily and taken to the shop, by removing the screws 5, 6 and 62. It will be apparent that the gear jack may be removed without disturbing the agitating means, and that the agitating means may be removed without disturbing the gear jack.

Our invention is not limited to the precise form herein shown, as many modifications within the principle of the invention will occur to those skilled in the art.

We claim as our invention:

1. An ice cream freezer comprising a base, a freezing cylinder mounted thereon, agitating means in said cylinder comprising two sections arranged for independent rotation, a clutch collar passing axially through one of the heads of the cylinder, said collar having clutch faces on both ends thereof, one of said agitator sections being arranged to engage the inner clutch face of the collar, a shaft rotatably mounted in the collar and permanently attached at its inner end to the other agitator section, a gear jack comprising a support removably mounted on said base and having a plurality of bearings coaxial with said cylinder, two gears independently supported in said bearings, and means for driving said gears, one of the gears having a clutch connection with the outer end of said collar, the other gear being non-rotatably associated with said shaft, the latter passing through both gear wheels, and the gear jack as a unit being withdrawable from said base and from the shaft.

2. An ice-cream freezer comprising a base, a freezing cylinder on said base, agitating means in said cylinder, a gear jack removably mounted on said base and comprising a plurality of bearings, gear wheels supported by said bearings, and means for rotating said gear wheels, and a shaft permanently attached to said agitating means and extending axially through said bearings and through said gear wheels, said gear jack being withdrawable as a unit from the base and from said shaft in a direction parallel with the shaft.

3. An ice-cream freezer comprising a freezing cylinder, a gear jack comprising three alined bearings, two wheels each having two sleeves rotatably mounted in two of said bearings, and means for rotating said wheels in opposite directions, a shaft extending through said sleeves and connected to a sleeve of one of said wheels, agitating means in the cylinder connected to said shaft, and agitating means in the cylinder arranged to be driven by a sleeve of the other wheel.

4. An ice cream freezer comprising a base, a freezing cylinder mounted thereon, agitating means in the cylinder comprising two sections arranged for independent rotation, a gear jack mounted on said base and comprising a support having a plurality of bearings, gear wheels independently supported in said bearings, and means for independently rotating said gear wheels, each of said gear wheels having an operative disengageable connection with one of the agitator sections, permitting the agitating means to be disengaged from the gear jack and withdrawn from the cylinder, the supporting base of the gear jack being detachably secured to the machine base, whereby the gear jack as a unit may be disengaged from the agitating means and removed from the machine.

5. An ice-cream freezer comprising a base, a freezing cylinder on said base, heads for said cylinder, a clutch-collar rotatably mounted in and extending through one of said heads, agitating means in the cylinder having a clutch connection with the inner end of said collar, three bearings on said base, said bearings being axially alined with said cylinder, two wheels, each having two sleeves rotatably mounted in two of said bearings, a shaft extending through said sleeves and through said collar and extending into said cylinder, agitating means in the cylinder attached to said shaft, a driving connection between said shaft and a sleeve of one of said wheels, a clutch connection between the sleeve of the other wheel and the outer end of said collar, and means for rotating said wheels in opposite directions.

6. An ice cream freezer comprising a base, a freezing cylinder mounted thereon, agitating means in the cylinder comprising two sections arranged for independent rotation, a gear jack mounted on said base and comprising a support having a plurality of bearings coaxial with said cylinder, gear wheels independently supported in said bearings, and means for independently rotating said gear wheels, a clutch collar passing axially through one of the cylinder heads and having a disengageable connection at its inner end with one of the agitator sections, the collar having a disengageable connection at its outer end with one of said gear wheels, a shaft permanently fixed at its inner end to the other agitator section and passing through said clutch collar and through the two gear wheels and non-rotatably connected to the other gear wheel, the support of the gear jack being detachably bolted to the machine base and to the cylinder, the agitating means being disengageable from the gear jack and withdrawable from the cylinder without disturbing the gear jack, and the gear jack being detachable from the machine base and the cylinder and being withdrawable along said shaft to disassociate the jack from the machine without disturbing said agitating means.

7. An ice cream freezer having, in combination, a cylinder, a rear head secured to the cylinder, a stuffing-box bearing in said rear head, a front head detachably secured to the cylinder, a tubular driving element rotatably supported in said stuffing-box bearing, an agitator within the cylinder and rotatably supported at its front end by the front head, said agitator comprising a section having a detachable clutch engagement with the inner end of said driving element, and another section having a shaft rotatably and withdrawably supported in said driving element, and means for rotating said driving element, said shaft being detachably connected at a point outside the cylinder to said rotating means.

In testimony whereof we affix our signatures in the presence of two witnesses.

THEODORE L. VALERIUS.
OLAF LARSEN.

Witnesses:
L. A. FORSYTH,
H. A. SIECK.